(12) United States Patent
Nosker et al.

(10) Patent No.: US 8,629,221 B2
(45) Date of Patent: Jan. 14, 2014

(54) COMPOSITIONS AND METHODS OF MAKING PLASTIC ARTICLES

(75) Inventors: Thomas J. Nosker, Stockton, NJ (US); Richard W. Renfree, Scotch Plains, NJ (US); Maryann Renfree, legal representative, Scotch Plains, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 1387 days.

(21) Appl. No.: 10/501,701

(22) PCT Filed: Jan. 16, 2003

(86) PCT No.: PCT/US03/01468
§ 371 (c)(1),
(2), (4) Date: May 5, 2005

(87) PCT Pub. No.: WO03/062319
PCT Pub. Date: Jul. 31, 2003

(65) Prior Publication Data
US 2005/0192403 A1     Sep. 1, 2005

Related U.S. Application Data

(60) Provisional application No. 60/349,211, filed on Jan. 16, 2002.

(51) Int. Cl.
*C08L 69/00* (2006.01)
*C08L 23/06* (2006.01)
*C08J 5/00* (2006.01)
*E01B 3/44* (2006.01)

(52) U.S. Cl.
USPC .......................................... 525/461; 525/534

(58) Field of Classification Search
USPC ................... 525/67, 88, 55, 534, 461
See application file for complete search history.

(56) References Cited

U.S. PATENT DOCUMENTS

| | | | |
|---|---|---|---|
| 4,022,646 A * | 5/1977 | Casey ........................... | 156/164 |
| 4,110,420 A | 8/1978 | Turner | |
| 5,011,005 A * | 4/1991 | Boyd et al. .................... | 206/0.81 |
| 5,098,610 A | 3/1992 | Okamura et al. | |
| 5,189,139 A | 2/1993 | Tuinstra et al. | |
| 5,212,223 A | 5/1993 | Mack et al. | |
| 5,298,214 A | 3/1994 | Morrow et al. | |
| 5,334,647 A * | 8/1994 | Sperk et al. ................... | 524/507 |
| 5,569,424 A | 10/1996 | Amour | |
| 5,652,275 A | 7/1997 | Buysch et al. | |
| 5,744,517 A * | 4/1998 | Chung ........................... | 523/136 |
| 5,789,477 A | 8/1998 | Nosker et al. | |
| 5,814,264 A * | 9/1998 | Cai et al. ....................... | 264/408 |
| 5,886,078 A | 3/1999 | Sullivan et al. | |
| 5,916,932 A | 6/1999 | Nosker et al. | |
| 5,937,521 A * | 8/1999 | March et al. ................. | 29/897.34 |
| 5,989,683 A * | 11/1999 | Haddock et al. .............. | 428/167 |
| 6,001,491 A * | 12/1999 | Bayer et al. ................... | 428/500 |
| 6,007,005 A | 12/1999 | Gonzales et al. | |
| 6,191,228 B1 | 2/2001 | Nosler et al. | |
| 6,197,854 B1 * | 3/2001 | Krishnan et al. .............. | 524/111 |
| 2002/0017743 A1 * | 2/2002 | Priedeman, Jr. .............. | 264/464 |
| 2002/0099160 A1 * | 7/2002 | Shiping ........................... | 528/10 |
| 2007/0082995 A1 * | 4/2007 | Costanzi et al. .............. | 524/414 |

FOREIGN PATENT DOCUMENTS

| | | | |
|---|---|---|---|
| CA | 2199487 | | 3/1996 |
| WO | WO 96/07703 | * | 3/1996 |

OTHER PUBLICATIONS

Mekhilef, "Weld Lines in Injection Moldable Immiscible Blends . . . " Polymer, 36(10), 2033-42 (1995).*
Leclair et al., Polymer, vol. 37, pp. 4723-4728, 1996.*
Kieser et al. CAPLUS AN 2002:630660, Aug. 2002.*
Xu et al., Macromol. Mater. Eng. 289, p. 1087-1095 (2004).*
Gillespie et al., "Development of a Recycled Plastic/Composite Crosstie", American Railway Engineering Association, vol. 98, No. 760, pp. 181-187, 1997.
Nosker et al. "A Performance-Based Approach to the Development of a recycled Plastic/Composite Crosstie", Proc. Society of Plastic Engineers, ANTE Conference, 1998.

* cited by examiner

*Primary Examiner* — Jeffrey Mullis
(74) *Attorney, Agent, or Firm* — Fox Rothschild LLP (57) ABSTRACT

Disclosed are immiscible polymer blends, plastic articles containing the blends, and methods for making the plastic articles. One type of article is plastic lumber, which can be in the form of a railroad tie or a marine piling.

11 Claims, 5 Drawing Sheets

COMPOSITIONS AND METHODS OF MAKING PLASTIC ARTICLES

CROSS REFERENCE TO RELATED APPLICATIONS

The present application is a national phase entry under 35 U.S.C. §371 of International Application PCT/US03/01468, filed Jan. 16, 2003, published in English, which claims benefit of U.S. Provisional Patent Application 60/349,211, filed Jan. 16, 2002. The disclosures of all of said applications are incorporated by reference herein.

BACKGROUND

Plastic lumber is currently produced from high-density polyethylene ("HDPE"). This material is ubiquitous—it is the predominant material found in non-soda bottle applications in the U.S. and can be obtained from curbside collection programs. Not surprisingly, therefore, HDPE has become an acceptable substitute for chemically treated wood in many commercial products.

If HDPE has a shortcoming in terms of performance, it is its reduced stiffness compared to wood. Standard yellow pines have a modulus (a measure of stiffness) as measured along the main axis, of 1 to 1.2 million psi. Modulus tends to decrease with duration of exposure to the environment. In the case of yellow pine, for example, over the course of 10 years of outdoor exposure, its modulus will drop by 25-50%. The modulus of HDPE-based plastic lumber is typically about 10% of new standard yellow pine. In contrast to wood however, the modulus of this type of lumber does not significantly diminish over the same period of time.

To increase the stiffness of HDPE in railroad ties, materials such as fiber-reinforced composites, polymer-fiber-reinforced composites, mineral filled polymer composites, hybrid plastics, steel and concrete composites, have been added. See U.S. Pat. Nos. 5,789,477, 5,916,932 and 5,298,214. These efforts have been moderately successful, at best. It has been found to be unpredictable as to which stiffening agents can be mixed with HDPE, or any other plastic, and produce a material that is cohesive, workable and that meets the necessary performance criteria, all in a cost effective manner. For example, polyvinylchloride (PVC) and polyethylene terephthalate (PET) are unworkable at conditions in which HDPE is typically processed.

In addition to identifying materials that are compatible with HDPE from these standpoints, there is recognition of the benefit of using recycled materials. This would ensure a plentiful supply of material at low cost while providing an environmentally friendly solution to waste management.

SUMMARY OF THE INVENTION

A first aspect of the present invention is directed to an immiscible polymer blend comprising (1) polyethylene (PE) and (2) acrylonitrile-butadiene-styrene (ABS), polycarbonate (PC), or a mixture of ABS and PC. The PE has a melt flow of less than about 1, and more preferably less than 1, and the PC, ABS or mixture of PC and ABS has a melt flow greater than about 1, and more preferably greater than 1. In some embodiments, the polymer blend contains PE and ABS, PE and PC, or PE, ABS and PC. In preferred embodiments, the PE is high density PE (HDPE).

A second aspect of the present invention is directed to a plastic article containing the polymer blend. In preferred embodiments, the plastic article is in the form of plastic lumber, and more preferably is in the form of a railroad tie. Methods for making the plastic articles are also provided.

PC, ABS and PC/ABS blends are typically used in the construction of the housings of electronic components and in particular consumer electronics including TVs, radios, DVD players, VCRs, CD players, stereos, video cassette cartridges, video game players and computers, including monitor housings and CPU housings, accessory components and keyboards. Many parts of a computer can be recycled. However, the housing, which accounts for a significant proportion of the size and weight of the computer, inevitably finds its way to a landfill. Due to the meteoric growth in the computer and communications industries, the number of telephones, portable telephones, computers and electronic devices has increased tremendously. At present, there are few recycling possibilities for these materials. Thus, a significant advantage of the present invention lies in the nature of the sources for materials needed to make it. They are plentiful, cheap and environmentally efficacious.

DETAILED DESCRIPTION OF THE INVENTION

HPPE as well as low-density polyethylene (LDPE) may be used in the polymer blends and plastic articles of the present invention. *Modern Plastics Encyclopedia* describes HDPE as having a density of more than 0.940 gm/cc, whereas LDPE is described in terms of having a density between 0.916 gm/cc and 0.940 gm/cc. Regardless of the type of PE, it has a melt flow measured in accordance with ASTM D1238, of less than about 1 g/10 min at 190 C/2.16 Kg. In preferred embodiments, the PE has melt flow of less than 1 g/10 min at 190 C/2.16 Kg, in which embodiments the PE is said to possess a fractional melt flow. HDPE is the preferred PE for use in the present invention. HDPE can be obtained from a variety of sources; it may be virgin or recycled in nature. Recyclable HDPE is contained in commercial products such as milk bottles, water bottles and detergent bottles.

PC in accordance with the present invention is a synthetic thermoplastic resin derived from, amongst other sources, bisphenol A and phosgene. PCs can be formed from any dihydroxy compound and carbonate di-ester or by ester interchange. See, e.g., U.S. Pat. No. 5,189,139 (teaching a method of preparation of a polycarbonate comprising reacting a diaryl carbonate with a bisphenol to produce a polycarbonate and a phenol, regenerating the diaryl carbonate by reacting the phenol byproduct with a carbonyl halide, and optionally recycling the hydrogen halide using a metal Redox captive halogen swing reactor system). PC as used in the present invention is not limited to virgin materials; it may be recycled material. For example, PC is found in molded products, solution-cast extruded film, structural parts, tubes and piping, prosthetic devices, meter face plates, nonbreakable windows, street light globes, household appliances and housings of electronic devices such as consumer electronics. Injection molding grades of PC are preferred. Methods of obtaining recycled PC are known in the art. See, e.g., U.S. Pat. Nos. 5,212,223 and 5,652,275.

ABS is an engineering plastic used in automobile body parts and for fittings in telephones, bottles, heels, luggage, packaging, refrigerator door linings, plastic pipes, building panels, shower stalls, boats, radiator grills and housings for electronics equipment and business machines including consumer electronics. Most ABS resins are true graft polymers consisting of an elastomeric polybutadiene or rubber phase, grafted with styrene and acrylonitrile monomers for compatibility, dispersed in a rigid styrene-acrylonitrile matrix. However, mechanical poly-blends of elastomers and rigid copolymers are also available. Virgin ABS resin may be used in accordance with the present invention. ABS is somewhat expensive when supplied in its purest form. For this reason, recyclable sources of this polymer are preferred for use in the present invention. ABS is extensively used in the manufacture of inexpensive, durable products. It is a primary material in the manufacture of products such as computer housings, computer monitor housings, televisions and automobile components. Methods of recycling ABS e.g., from these types of products, are known in the art. See, for example, U.S. Pat. No. 6,007,005. The PC, ABS and PC/ABS mixtures used in the present invention have a melt flow measured in accordance with ASTM D1238, of greater than about 1 g/10 min at 190° C./2.16 Kg. In preferred embodiments, the PC and ABS have a melt flow of greater than 1 g/10 min at 190° C./2.16 Kg.

The relative amounts of PE and the PC and/or ABS present in the polymer blends and plastic articles of the present invention vary depending on the commercial application and the desired properties. In general, the amount of PE ranges from about 50% to about 90%, and the amount of PC and/or ABS ranges from about 10% to about 50%, based upon the total weight of these polymers. As discussed below, the products of the present invention may contain additional elements. In some embodiments, the PE is present in an amount of about 60-65% by weight, and the PC and/or ABS is present in an amount of about 35-40% by weight. Beyond these general guidelines, the relative amounts of PE, PC and/or ABS will be determined on the basis of the ultimate commercial application. For example, the strength and stiffness requirements of a formulation used for the production of decorative items, furniture, household containers and the like are not as rigorous as the requirements for railroad ties and marine pilings. Where less demanding applications are envisioned, considerations such as the availability and relative cost of the components of the blend may play a relatively important role in determining the ultimate blend composition compared to maximizing the strength and stiffness.

Figure 1:
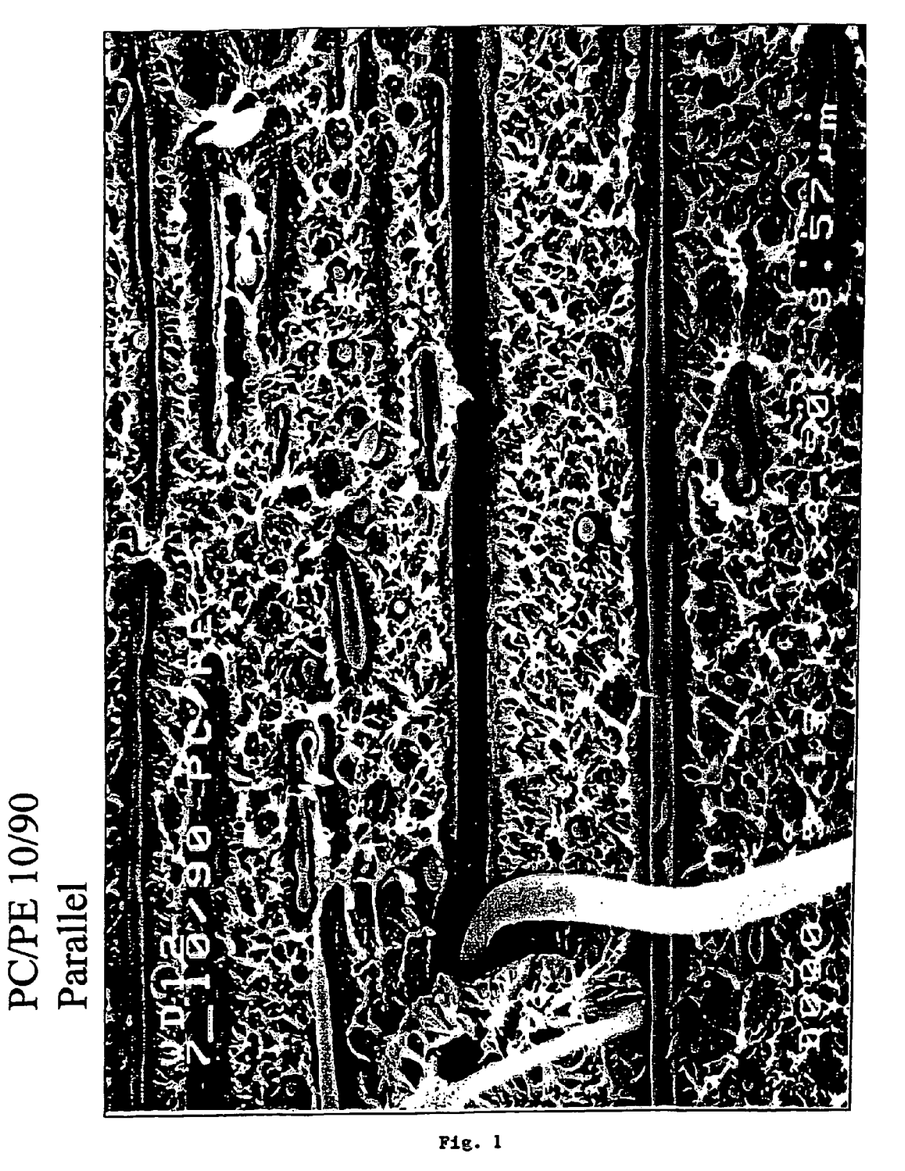
FIG. 1 is a scanning electron microscopy (SEM) photograph illustrating the microstructure of an immiscible polymer blend of the present invention containing 90% PE and 10% PC, wherein the PC fibers have a high aspect ratio which is desirable for composites.
Figure 2:
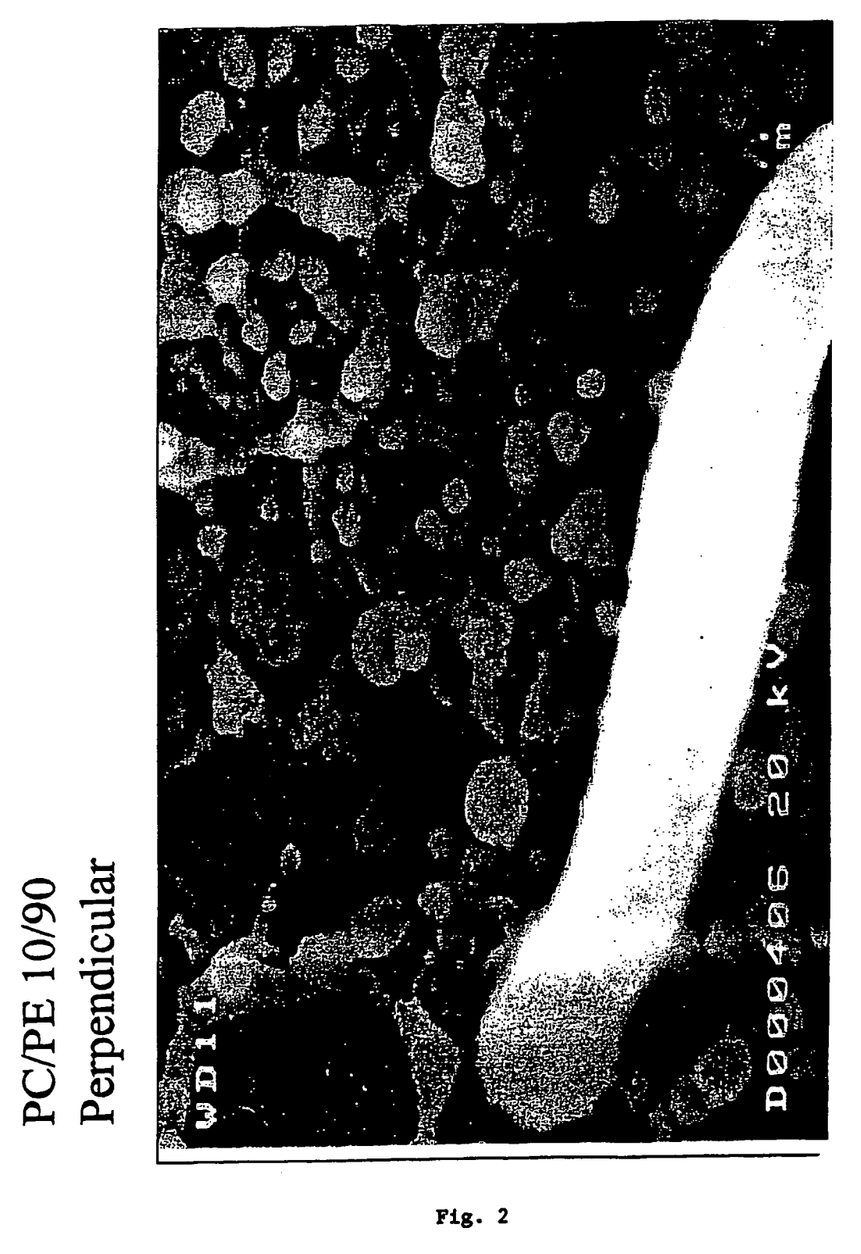
FIG. 2 is a scanning electron microscopy (SEM) photograph (at a much higher magnification) illustrating the microstructure of an immiscible polymer blend of the present invention containing 90% PE and 10% PC, wherein the diameter of the PC fibers is on the order of 30-40 nanometers, thus showing a very fine structure.
Figure 3:
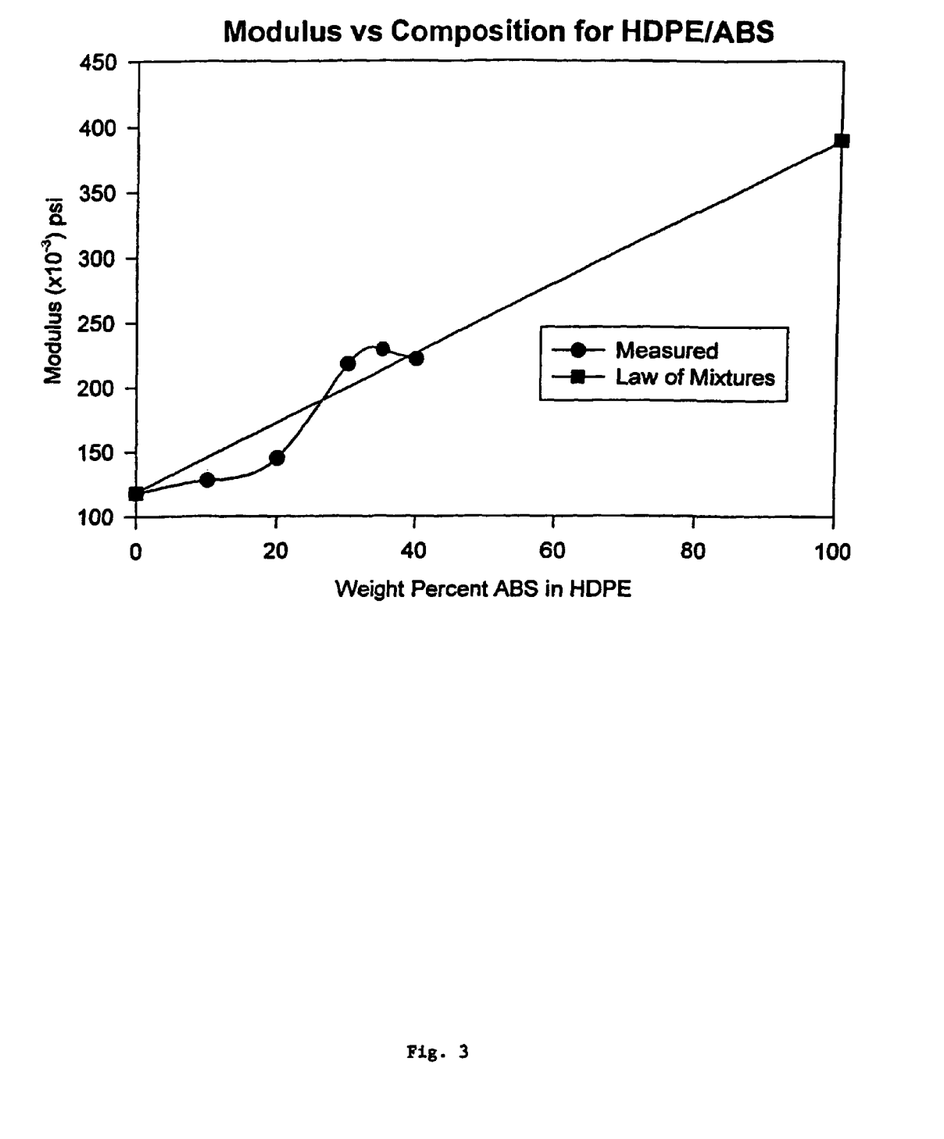
FIG. 3 is a graph that plots the modulus versus the weight percent of PC in a polymer blend of the present invention containing HDPE and PC.
Figure 4:
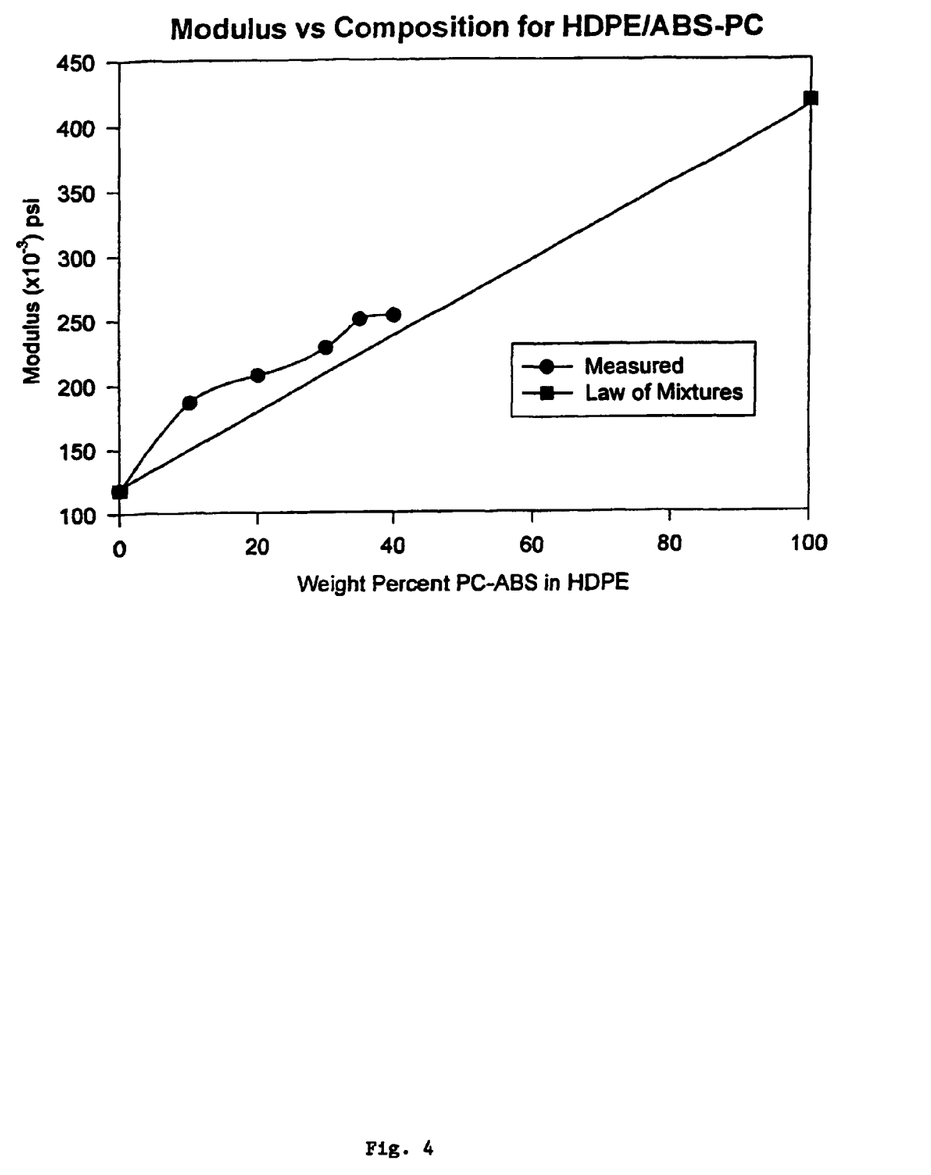
FIG. 4 is a graph that plots the modulus versus the weight percent of ABS in a polymer blend of the present invention containing HDPE and ABS.
Figure 5:
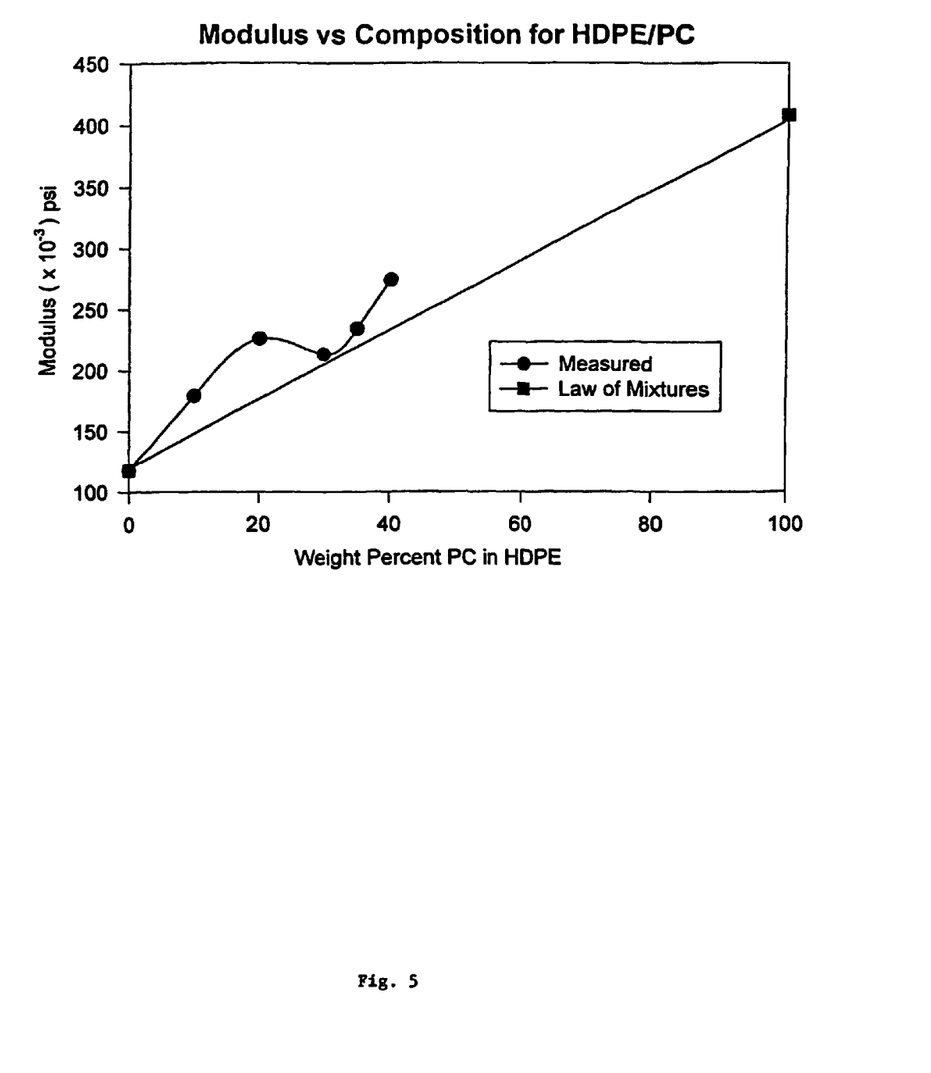
FIG. 5 is a graph that plots the modulus versus the combined weight percent of PC and ABS in a polymer blend of the present invention containing HDPE, ABS and PC.

A significant factor in determining the relative amounts of these polymers is the desired stiffness of the plastic article. The immiscible polymer blends of the present invention result in a plastic composite article having a measure of stiffness greater than that of an article made with the PE alone (i.e., without the PC, ABS or mixture thereof) The stiffness of any given article must be measured in accordance with established industry standards. In the case of railroad ties, for example, the resulting modulus E of the composition should be at least about 170,000, and have strength of at least about 2500 psi, both as measured by ASTM D6109-97. Referring to FIG. 3, the linear plot shows modulus of various mixtures of HDPE and ABS based on the law of mixtures. The curved line shows that the blends actually tested exhibited a modulus greater than what would have been expected based upon the additive contributions of each polymer to overall stiffness. Thus, a synergistic effect was achieved. The graph also shows what combinations of HDPE and ABS will result in a specific modulus, as well as which combinations will result in a stiffness greater than PE alone. Here, a blend containing about 10% ABS and about 90% HDPE will have a modulus of about 175,000. FIGS. 4 and 5 provide similar information and also show synergistic effects of various combinations of HDPE and ABS/PC, and HDPE and ABS, respectively. For ease of review, the data plotted on FIGS. 3-5 are also set forth in Tables II-IV, below. Marine pilings have even higher stiffness requirements. In this case, the modulus is typically about 250,000 as measured by ASTM D6109-97.

In addition to HDPE, PC, ABS and PC/ABS blends, the blend or formulations of the present invention may also include other materials, preferably in an amount of less than about 40%, most preferably less than about 20%, and even more preferably less than about 10% by weight of the article. These other materials can include other plastics or polymer materials such as polyphenylene oxide (PPO). The polymer blends of the present invention preferably do not include PVC because it tends to break down during conditions under which PE is processed. Most desirably, formulations in accordance with the present invention contain less than about 1% total PVC. Most preferably, the formulations useful in accordance with the present invention contain substantially no PVC (i.e., trace amounts or less). PVC is sometimes found in computer housings. Thus, when such materials are used as sources for PC and/or ABS, the PVC should be removed. Removal of PVC can be accomplished in accordance with standard techniques.

One or more reinforcing fillers may be used to further improve upon the various properties such as the tensile strength, impact strength, stiffness, and heat distortion properties of the composite. The reinforcing fillers are often used in conjunction with coupling agents, such as silanes and titanates, to facilitate the incorporation of the filler into the polymer matrix. Examples of fillers include fiberglass, asbestos, wollastonite, whiskers, carbon filaments, talc, clays (e.g., kaolin), mica, calcium carbonate, fly ash, and ceramics. Filamentous fillers such as glass fibers typically provide the greatest impact and tensile strength properties while the addition of relatively plate-like structures like talc and mica generally result in increased stiffness and heat distortion. Glass fibers are desirable choices because they improve stiffness without significantly reducing impact properties or increasing density. See U.S. Pat. No. 5,916,932. At the same time however, they are very expensive and also cause significant wear of the processing equipment. Consequently, less expensive fillers such as talc and mica have been used as substitutes for glass fibers. A potential disadvantage of these fillers, depending upon the ultimate application, is that they have a much higher density that typically results in heavier composite articles than those employing glass fibers.

The plastic articles of the present invention may contain other additives such as compatibilizers (e.g., maleic anhydride copolymers and ionomers, acrylate copolymers and ethylene acrylic acid copolymers), which effectuate the mixing (i.e., compatibility) of two or more polymers, antioxidants, UV stabilizers, lubricants, antifungal agents and colorants. These various additives may be added during fabrication of the construction article or may be present in one of the initial polymeric components. Generally, reinforcing fillers and other additives are present in an amount of less than 20% by weight of the blend or article, more preferably less than 10% by weight of the blend or article.

The immiscible polymer blends in accordance with the present invention can be used to produce a wide variety of plastic or polymer composite articles. Such articles include furniture, containers such as bottles, trash receptacles, boxes, cartons, doormats, floor coverings, lawn decorations and ornaments, automobile parts, toys, wagons and gardening carts, buildings and sheds, furniture e.g., casual furniture such as used for indoor/outdoor use including tables and chairs, park benches etc., housings for electronic components including consumer electronics such as radios, televisions, stereo systems, VCRs, DVDs, video game players and cartridges, computer housings, keyboards and monitors and the like. Preferred plastic articles are in the form of lumber e.g., structural beams, marine pilings, railroad ties, telephone poles, blocks, boards, sheets, panels and the like. These may be structural, decorative or both. They may be textured to simulate wood grain, to simulate clapboard or cedar shake or may have raised or imprinted designs of any manner. They may also include indicia. Preferred articles are in the form of plastic lumber. Such articles may be used almost anyplace where dimensional lumber or sheets are currently used. They can be used, for example, in house construction in place of boards, interior and exterior plywood, flooring, roofing, decks and rafters. More preferred applications pertain to railroad ties.

Methods of polymer processing and fabrication methods known in the art for producing construction materials can be utilized to produce the blends and articles of the present invention. These methods include both extrusion and/or molding processes such as continuous extrusion, and injection and compression molding. Extrusion processes are preferred. Typically, the polymer (and non-polymeric) components are dry blended at about room temperature, and then fed into an extruder where they are melted and mixed. The operating conditions of the extruder may vary but an L (length) to D (diameter) ratio of from about 24:1 to about 36:1, a compression screw ratio of about 3:1, and an extrusion temperature of about 220° C. are preferred. The extruded blend comes out of a die into a mold, shaped in the form of the article (or a part thereof). In the case of a railroad tie, for example, the mold typically has dimensions of about 7"×9"×8.5-10'. Once the filled mold is cooled to about room temperature, its contents are ejected.

Further steps may be necessary or desirable in certain circumstances, such as when the blend contains PC or when the composition of the plastics (e.g., a recycled source) is unknown. If the blend includes PC, which is hydroscopic in nature, it is important that it be dried at some time before being melted. Dessication dryers, vacuum ovens and the like are suitable for this purpose. If the content of the incoming plastic material is not known, then a sorting step should be employed. One method of sorting in accordance with the present invention utilizes a Fourier transform infrared spectrophotometer ("FTIR") set in reflective mode. The FTIR may have a photo acoustic detector attachment. A database is prepared of the FTIR patterns of as many polymer types as possible. Then the patterns of unknown materials can be matched to the database of known samples. Samples of unknown materials can be obtained by producing a small disc punched from their bodies. Those punched sections can be analyzed by FTIR. Most preferably, the analysis is conducted by exposing the cross section of the disc to the FTIR such that the results are not distorted in the event that the inner or outer layer of the source is covered by a material different than the core. In this way the composition of the incoming raw material can be analyzed. X-ray fluorescence spectrophotometry is another useful technique. This technique is advantageously employed to detect PVC. The object of such sorting is twofold, namely: 1) to identify the materials going into the polymer blends so as to predict the resulting properties; and 2) to eliminate undesirable components such as PVC. This sorting technique is principally used to identify the composition of PC, ABS or PC/ABS blends in an incoming stream of recycled raw materials. It may, of course, also be used in connection with determining whether unwanted materials such as PVC are present and/or in connection with the PE.

Depending on the content of PC, ABS or PC/ABS blend contained in a recyclable waste material, it may be necessary or desirable to augment with additional quantities of one or more of the plastic materials. After sorting, the resulting materials can be stored for later use or processed and formed as discussed above.

Class 1 railroad ties are a particularly demanding application. Railroad ties are exposed to significant stress. Not only must they bear the weight of a train but they must also bear the dynamic stress of a moving train. They must withstand extremes of temperature and moisture as well as environmental factors such as oil, diesel fuel, acid rain and the like. See Nosker et al., *Development of a Recycled Plastic/Composite Cross Tie*, 98 Am. Railway Engineering Bulletin No. 760 (1997) and Nosker et al., *A Performance-Based Approach to the Development of Recycled Plastic Composite Cross Tie*, Proc. Society of Plastic Engineers 1998 Antec Conference, Atlanta, Ga., April 1998. Properties of railroad ties (e.g., testing requirements) and methods of making railroad ties from plastics, including recycled plastic materials, are known in the art. See, U.S. Pat. Nos. 5,569,424; 5,789,477; 5,886,078; 5,916,932; and 6,191,228 (teaching the "batch" and "continuous" processes).

The invention will now be described by way of the following examples. These examples are not meant to limit the invention in any way. Unless otherwise indicated, all parts and percentages are by weight. Tables I-IV below compare the tensile properties of pure, bottle grade, recycled HDPE, ABS, PC and mixtures of PC/ABS with various blends, as measured in accordance with ASTM D638.

TABLE I

Tensile properties of HDPE

| SAMPLE | MODULUS (psi) | ULTIMATE STRENGTH (psi) |
| --- | --- | --- |
| 100% HDPE | 118,000 | 2,600 |

TABLE II

Tensile properties of mixtures of ABS and HDPE

| SAMPLE | MODULUS (psi) | ULTIMATE STRENGTH (psi) |
| --- | --- | --- |
| 10% ABS 90% HDPE | 128,000 | 2,700 |
| 20% ABS 80% HDPE | 145,000 | 2,800 |

TABLE II-continued

Tensile properties of mixtures of ABS and HDPE

| SAMPLE | MODULUS (psi) | ULTIMATE STRENGTH (psi) |
|---|---|---|
| 30% ABS 70% HDPE | 218,000 | 3,300 |
| 35% ABS 65% HDPE | 229,000 | 3,400 |
| 40% ABS 60% HDPE | 222,000 | 3,500 |
| 100% ABS | 390,000 | 5,500 |

TABLE III

Tensile properties of mixtures of PC/ABS and HDPE

| SAMPLE | MODULUS (psi) | ULTIMATE STRENGTH (psi) |
|---|---|---|
| 10% PC/ABS 90% HDPE | 186,000 | 3,100 |
| 20% PC/ABS 80% HDPE | 207,000 | 3,300 |
| 30% PC/ABS 70% HDPE | 228,000 | 3,700 |
| 35% PC/ABS 65% HDPE | 250,000 | 4,100 |
| 40% PC/ABS 60% HDPE | 253,000 | 4,300 |
| 100% PC/ABS | 418,000 | 7,900 |
| VACUUMED PC/ABS | 419,000 | 8,000 |

TABLE IV

Tensile properties of mixtures of PC and HDPE

| SAMPLE | MODULUS (psi) | ULTIMATE STRENGTH (psi) |
|---|---|---|
| 10% PC 90% HDPE | 179,000 | 3,100 |
| 20% PC 80% HDPE | 226,000 | 3,400 |
| 30% PC 70% HDPE | 213,000 | 3,800 |
| 35% PC 65% HDPE | 234,000 | 4,100 |
| 40% PC 60% HDPE | 274,000 | 4,200 |
| PC DRY | 408,000 | 9,000 |

Tables V-VII compare the modulus and ultimate strength of recycled materials versus their virgin counterparts. The data show that the properties are comparable such that virgin or recycled polymers can be used.

TABLE V

Tensile properties of 100% recycled ABS and virgin ABS

| SAMPLE | MODULUS (psi) | ULTIMATE STRENGTH (psi) |
|---|---|---|
| 100% ABS | 390,000 | 5,500 |
| Virgin ABS | 270,000–400,000 | 3,300–8,000 |

TABLE VI

Tensile properties of 100% recycled PC/ABS and virgin PC/ABS

| SAMPLE | MODULUS (psi) | ULTIMATE STRENGTH (psi) |
|---|---|---|
| 100% PC/ABS | 418,000 | 7,900 |
| VACUUMED 100% PC/ABS | 419,000 | 8,000 |
| Virgin PC/ABS | 350,000–455,000 | 5,800–9,3000 |

TABLE VII

Tensile properties of 100% recycled PC and virgin PC

| SAMPLE | MODULUS (psi) | ULTIMATE STRENGTH (psi) |
|---|---|---|
| 100% DRY PC | 408,000 | 9,000 |
| Virgin PC | 350,000 | 9,200–9,500 |

All patent and non-patent publications cited in this specification are indicative of the level of skill of those skilled in the art to which this invention pertains. All these publications and patent applications are herein incorporated by reference to the same extent as if each individual publication or patent application was specifically and individually indicated as being incorporated by reference herein.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A plastic or polymer composite article formed from an immiscible polymer blend comprising 60% or greater of a high density polyethylene (HDPE) matrix phase and 40% or less of a polycarbonate (PC) phase, wherein:
    said PC phase of said immiscible polymer blend consists essentially of fiber-shaped domains having a lengthwise dimension aligned essentially parallel in said HDPE matrix phase;
    said HDPE has a melt flow at 190° C./2.16 Kg of less than 1 g/10 min, and said PC has a melt flow of an injection molding grade PC,
    the ratio of HDPE to PC provides a blend having a modulus greater than the additive contribution of each polymer to overall stiffness and
    the amount of HDPE and the amount of PC when added together equal 100%.

2. The composite article of claim 1, which is formed into the shape of lumber.

3. The composite article of claim 1, which is a railroad tie.

4. The composite article of claim 1, which is a marine piling.

5. A method of making a plastic or polymer composite article, comprising:
    (a) preparing an immiscible polymer blend comprising 60% or greater high density polyethylene (HDPE) and 40% or less polycarbonate (PC), wherein said HDPE has a melt flow at 190° C./2.16 Kg of less than 1 g/10 min, and said PC of an injection molding grade PC, and wherein the ratio of HDPE to PC provides a blend having a modulus greater than the additive contribution of each polymer to overall stiffness and wherein the amount of HDPE and the amount of PC when added together equal 100%; and (b) extruding said polymer blend into a mold so that the PC phase of said immiscible polymer blend consists essentially of fiber-shaped domains having a length-wise dimension aligned essentially parallel in said HDPE matrix phase.

6. The method of claim 5 wherein said preparing step comprises a step of continuous extrusion of said polymer blend.

7. The method of claim 5 wherein said preparing step comprises a step of extruding said polymer blend.

8. The method of claim 5 wherein said molding step comprises injection molding.

9. The polymer blend of claim 1, wherein at least one of said HDPE or PC is recycled.

10. The method of claim 5, wherein at least one of said HDPE or PC is recycled.

11. The composite article of claim 1 wherein said PC has a melt flow greater than 1.

* * * * *